No. 849,367. PATENTED APR. 9, 1907.
B. F. BURKE.
ARTIFICIAL BAIT.
APPLICATION FILED JUNE 16, 1906.

Witnesses
M. A. Schmidt
Geo. E. Tew

Benjamin F. Burke
Inventor
by C. B. Stevens Leo
Attorneys

UNITED STATES PATENT OFFICE.

BENJAMIN F. BURKE, OF CHICAGO, ILLINOIS, ASSIGNOR OF ONE-HALF TO MATTHEW CORBETT, OF CHICAGO, ILLINOIS.

ARTIFICIAL BAIT.

No. 849,367.     Specification of Letters Patent.     Patented April 9, 1907.

Application filed June 16, 1906. Serial No. 322,035.

*To all whom it may concern:*

Be it known that I, BENJAMIN F. BURKE, a citizen of the United States, residing at Chicago, in the county of Cook and State of Illinois, have invented new and useful Improvements in Artificial Bait, of which the following is a specification.

This device comprises a hollow float or receptacle suitable for a surface bait and which can be changed into a submerged bait or baiting device. The float or device comprises a spherical or egg-shaped shell somewhat flattened and preferably made in two parts, with flanges. The said flanges are usually soldered or otherwise attached together.

An especial feature of this invention is that means are provided for sinking the said bait device, so as to make the same submerged when desired. This is accomplished by a valve through which any desired amount of water can be admitted into the interior of the float, so as to increase or decrease its buoyancy.

Figure 1:
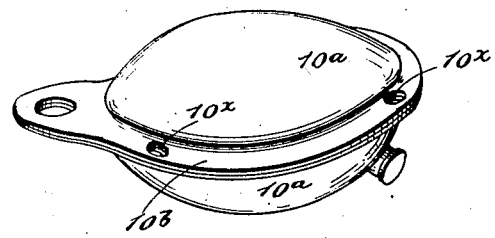
Figure 2:
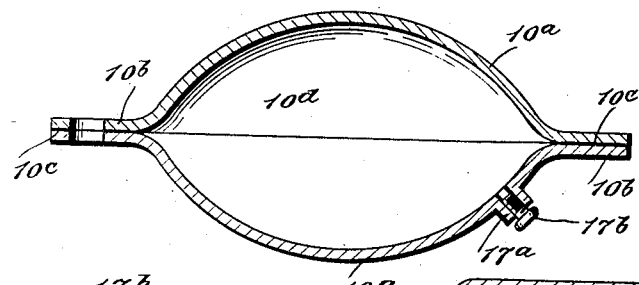
Figures 3, 4:
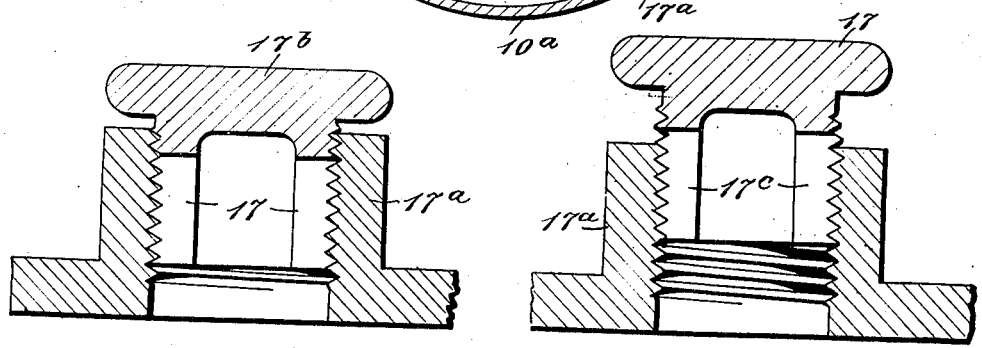
Figure 5:
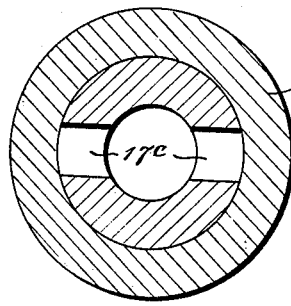
Figure 6:
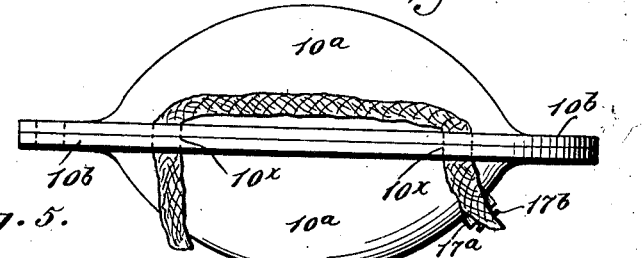

In the accompanying drawings, Figure 1 is a perspective of one of the baits. Fig. 2 is a longitudinal section. Figs. 3, 4, and 5 are sectional details of the valve. Fig. 6 is a side elevation of the device with special bait attached.

The device comprises a somewhat egg-shaped or spherical shell consisting of two half-shells $10^a$ preferably, which are provided with flanges $10^b$, which are soldered or otherwise united, as at $10^c$. These two shells form a hollow water-tight receptacle $10^d$, which will normally float on water. The flanges are extended at the front end and have a hole to receive a hook. Other trailing or snag hooks may be similarly connected, if desired. The shell may be made of copper or other suitable metal and nickel-plated to form a bright and attractive object, or it may be otherwise coated or covered, according to the kind of fish to be caught. It is particularly suitable for casting for game fish, and suitable coloring or enameling may be placed on the same, so as to attract the fish. The float is provided with a valve consisting of a screw-threaded nipple $17^a$, having a hollow plug $17^b$. The sides of this plug have lateral notches $17^c$, so that water can be admitted without entirely removing the plug. By unscrewing the plug water will be allowed to enter to the extent desired and then shut off by screwing in the plug. The amount of water admitted controls the buoyancy of the bait, and consequently it can be adjusted to sink slowly or quickly or to give more or less weight to the bait.

In making this device various kinds of metal or other material may be used. For example, rubber may be employed, preferably white rubber, the bait being molded in one piece. In the flanges of the bait are holes $10^x$, in which may be inserted a colored cord, ribbon, or other device, as shown in Fig. 6.

This device is very suitable for spring fishing, when some fish do not rise to the top of the water. It is also suitable on account of its adjustable buoyancy for use in various kinds of fishing. It thus comprises a very suitable device for all seasons or fishing periods of the year and is suitable for all kinds of water. The buoyancy can be readily adjusted by the fisherman in a few seconds by immersing the bait in water and manipulating the valve, the construction of which is such that the inflowing water can be quickly cut off or nicely regulated as to amount.

I claim—

1. An artificial bait comprising a hollow body having means to admit various quantities of water therein, whereby its buoyancy is adjusted.

2. An artificial bait having means whereby its buoyancy may be adjustably varied.

3. An artificial bait comprising a hollow body having a valve therein, adapted to admit water into the same.

4. An artificial bait comprising a hollow body, a nipple opening within the same, and a hollow screw-plug in the nipple having notches in the sides, through which water may be admitted without removing the plug.

5. An artificial bait comprising a body having a flange provided with holes, and a bait-strip secured in the holes.

6. A bait comprising a floatable body having an interior chamber adapted to contain water.

7. A bait comprising a floatable body composed of rubber and having an interior chamber and an inlet and outlet opening.

In testimony whereof I have signed my name to this specification in the presence of two subscribing witnesses.

BENJAMIN F. BURKE.

Witnesses:
   SIGNA FELTSKOG,
   H. G. BATCHELOR.